Oct. 3, 1950  G. B. SUTTLES, JR  2,524,641
ANIMAL SPRAYER
Filed July 2, 1945  2 Sheets-Sheet 1
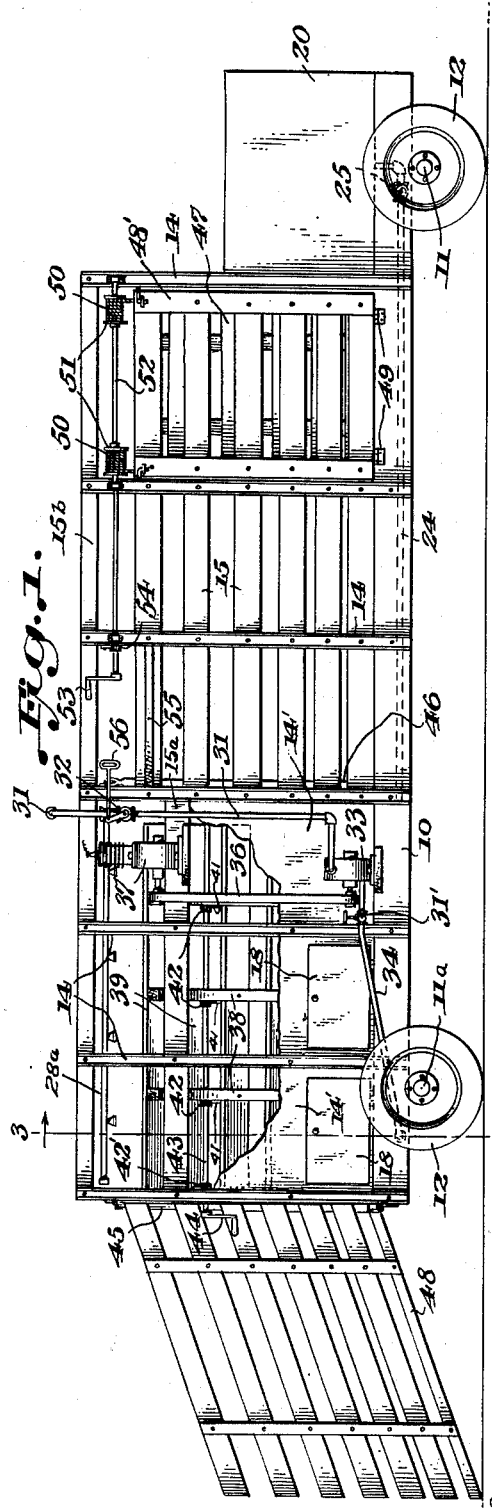
Inventor,
Green B. Suttles, Jr.
By A. Yates Dowell Atty.

Oct. 3, 1950     G. B. SUTTLES, JR     2,524,641
ANIMAL SPRAYER
Filed July 2, 1945     2 Sheets-Sheet 2
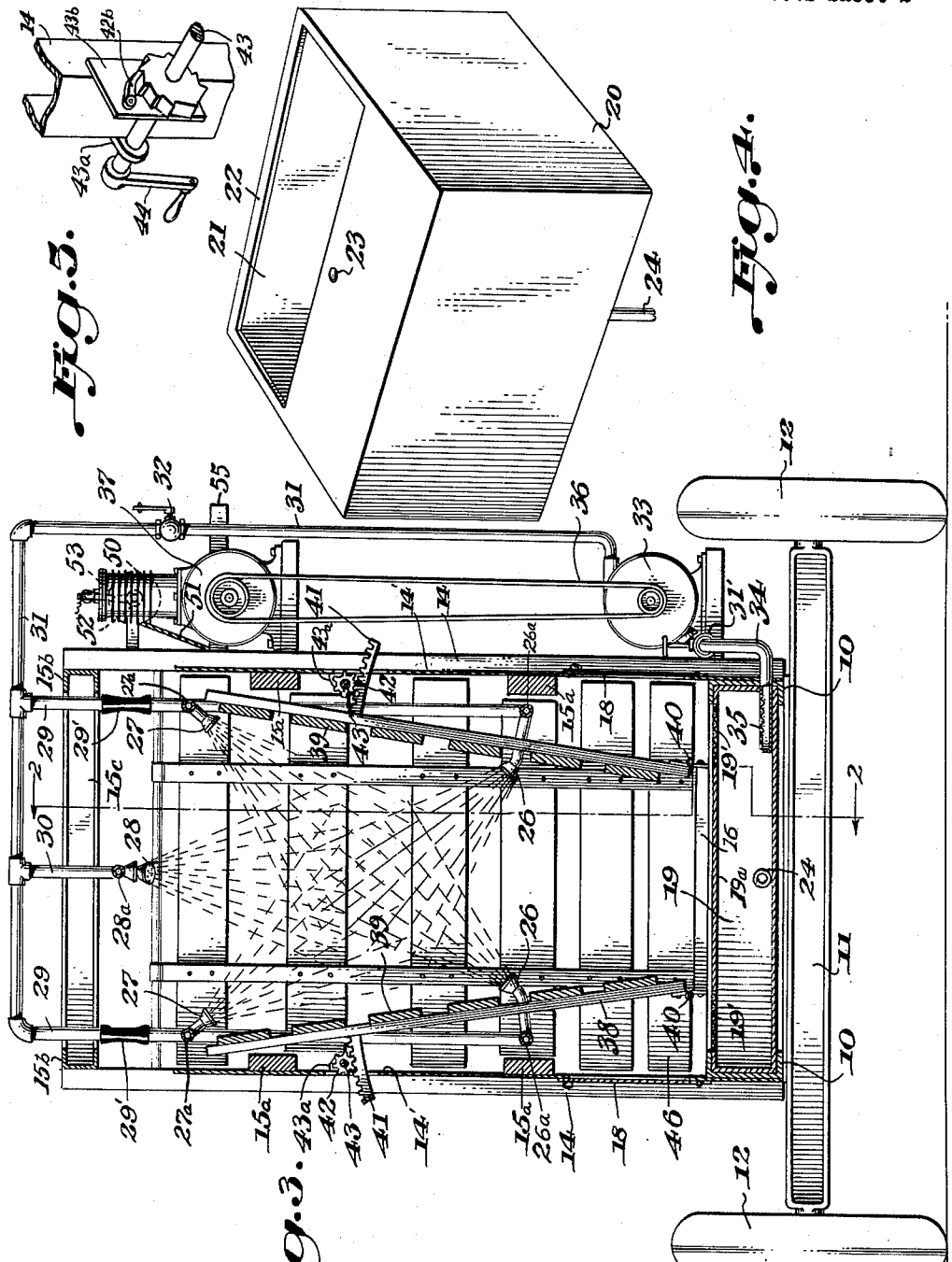
Inventor,
Green B Suttles Jr.

Patented Oct. 3, 1950

2,524,641

UNITED STATES PATENT OFFICE 2,524,641

ANIMAL SPRAYER

Green B. Suttles, Jr., Selma, Ala.

Application July 2, 1945, Serial No. 602,890

3 Claims. (Cl. 119—159)

This invention relates to animal treatment or care and more particularly to the treatment or care of livestock to remove and keep them free of parasites, as well as to keep the bodies of the animals clean.

It has been customary to employ a dipping vat for removing parasites from the exterior of the bodies of animals. The use of a dipping vat offers certain problems, for example, transportation either of the animals to the vat or transporting the vat to the animals.

It is an object of the invention to overcome the above problem and to provide a practical portable structure by means of which animals of all sizes can be simply and quickly treated at one location and the structure moved to another location for treatment of other animals.

Another object of the invention is to provide a portable spraying device or vehicle in which the size and direction of the sprays may be varied to more satisfactorily treat the animals without wasting liquid.

A further object of the invention is to provide a sprayer of relatively simple, inexpensive and durable construction, and which can be easily cleaned and kept clean.

Figure 1 is a side elevational view illustrating one application of the invention;

Fig. 2, a vertical longitudinal section on the line 2—2 of Fig. 3;

Fig. 3, a transverse section on the line 3—3 of Fig. 1;

Fig. 4, an enlarged detailed perspective of the supply tank, and,

Fig. 5, a fragmentary detail illustrating one of the pawl and ratchet mechanisms.

The invention contemplates an inexpensive, portable unit of simple construction and relatively light weight which may be attached to another vehicle for moving it from place to place.

As shown in the drawings, the vehicle consists of a pair of longitudinal frame members or a chassis 10 on axles 11 and 11a supported by wheels 12. A draft member 13 is preferably provided at the front end of the frame and by means of such draft member the device may be towed. The draft member is preferably connected to the front axle 11.

The body of the structure includes framework of spaced uprights 14, horizontal side bars 15, and cross bars 15c. The horizontal side bars 15 are spaced apart from the floor to the top of the vehicle to retain the animals therein. The horizontal bars 15a and the corresponding uprights 14 adjacent the rear portion of the vehicle are provided with a sheet metal sheathing 14' which forms a solid liquid obstructing wall or screen. Clean-out doors 18, providing entry through the metal sheathing 14', are preferably placed between the uprights 14. The horizontal bars 15 may be fewer in number where the sheathing is applied. This portion of the body of the structure defines a spray chamber or compartment, and the unsheathed portion of the body consisting of the uprights 14 and horizontal bars 15 provides a drip rack or compartment.

A floor 16 is employed of plate metal having a non-skid surface. This floor extends through both compartments, and may be formed of sections. This type of floor is preferable because it may be readily cleaned and kept clean. An inclined drain pan 17 is disposed beneath the drip compartment or forward portion of the floor, and the liquid running down this pan will combine with excess liquid or solution sprayed over the animals in the spray compartment and be collected in the sump or tank 19 located beneath the spray chamber. The sump or tank 19 has an imperforate central section 19a and is provided at each side of the sump with a removable grill 19' through which the liquid may enter the tank 19. Thus the central portion of the spray chamber, access being had through the doors 18, and all of the drip chamber may be cleaned by sweeping.

In order to supply the necessary solution for spraying the animals, a mixing tank 20 is mounted on some accessible portion of the vehicle, as for example, adjacent the extremity of the drip compartment at the front of the vehicle as shown, and this tank as shown in Fig. 4 has an opening 21 with a rim 22 for preventing the solution from sloshing out of the receptacle.

The ingredients of the solution may be put into the tank through the opening in its top and mixed, and in order to determine the amount of liquid in the tank, an aperture 23 for a measuring stick in its exact center may be provided. The tank 20, in addition to serving as a mixing tank may also be used as an auxiliary reservoir, the solution in use being contained within the tank 19, and, when necessary, may be supplemented from the tank 20.

The receptacle 19 and tank 20 are provided with a fluid connection in the form of a pipe 24 controlled by a valve 25. As previously indicated, the valve 25 may be opened to provide communication between the tank 20 and the receptacle 19 and left open, or it may be closed after sufficient fluid has been supplied to the receptacle 19.

The spray compartment is provided with a plurality of spray nozzles 26 on a pair of horizontal supply pipes 26a arranged in a manner to direct flow of solution upwardly at each side under the animal being sprayed, and in a like manner at each side nozzles 27 on pipes 27a are provided to direct the spray downwardly on the animal. Central nozzles 28 on a supply pipe 28a are also utilized for directing the spray downwardly on the back of the animals.

The spray nozzles 26 and 27 are supplied by vertical pipes 29 communicating with pipes 26a and 27a, and the top nozzles 28 are supplied by a pipe 30 communicating with pipe 28a, the pipes 29 and 30 being supplied from pipe 31 controlled by a valve 32 from a pump 33 having a connection 34 extending into the receptacle 19.

The pipe 34 is provided with a screened entrance end 35 so that solid matter cannot pass through the system. Thus, upon operation of the pump 33, spray solution will be taken from the receptacle 19 through the pipe 34 and valve 31' into the pump and forced through the pipe 31 to the spray nozzles, in accordance with the operation of the control valves 31' and 32. The pump 33 may be driven in any desired manner, as for example by a belt 36 from a gasolene engine 37.

In order to accommodate animals of different sizes, and keep the animal regardless of size in the center of the spraying compartment so that maximum antiseptic benefits from the sprays will be received from the spraying operation, pivoted side members are provided comprising uprights 38 and bars or horizontal members 39. These side members are mounted by hinges 40 secured to the floor 16 so that the side members can be swung toward and from each other.

In order to provide means for moving the side members to accommodate small or large animals, the side members are provided with rack bars 41 spaced longitudinally and mounted on the uprights 38, which rack bars are engaged by gears 42 carried by shafts 43, suitably journalled in ears 43a on the uprights 14 which extend through suitable openings in the sheathing 14'. The shafts 43 may be rotated by cranks 44 at the front end of the spray compartment. A ratchet 42a and pawl 42b is provided on each of the shafts 43 for holding the pivoted side members in adjusted position. The arrangement shown in Fig. 5 is for the shaft 43 shown on the left in Fig. 3. Pawl 42b is pivoted on plate 43b. The pipes 29 may have flexible couplings 29' to allow movement of the nozzles 26 and 27 inwardly, when the pivoted side members are moved inwardly.

The sides of the front end of the vehicle which form the drip compartment serve to hold the animals until the greater portion of the excess solution has had an opportunity to drain from their bodies and flow along the drain pan back into the sump or receptacle 19.

Three hinged or swinging gates 45, 46, and 47 are preferably located respectively at the entrance to the spray compartment, at the discharge end of the spray compartment, and at the discharge end of the drip compartment. These gates are intended for manual operation in any desired manner and are provided in order that the animals may be held in the respective compartments for spraying and for permitting the excess solution to drain from the animals and be collected.

The spray and drip compartments may be of any desired length or size to accommodate one or more animals at a time. A detachable ramp 48 is provided at the rear or entrance end of the vehicle so that the animals may pass up the same into position to be sprayed.

At the front of the vehicle the gate 47 is pivoted at 49, and may be lowered to form a ramp 48' for the animals to pass down when they emerge from the drip compartment. For example, lowering mechanism may include cables 50 which wind around spaced drums 51 mounted on a shaft 52 provided with a crank 53, a ratchet and pawl 54 being provided for holding the parts in definite position, either lowered or in any intermediate position. The swinging gate 45 at the inlet end of the vehicle is adapted to be operated by the attendant who drives the animals into the spray compartment, while the swinging gate between the spray and drip compartments and for the discharge of the animals from the drip compartment is operated by an attendant who also controls the supply of fluid through the sprays. In order to accommodate the attendant, a platform 55 is mounted adjacent the center of the vehicle from which the attendant may manipulate the valve handle 56 operably connected to the valve 32 for controlling the fluid flow through the nozzles. The swinging gate 46 for permitting the animals to pass from the spray into the drip compartment and the crank 53 for opening the swinging ramp 48' to permit the animals to emerge from the drip compartment may likewise be operated by the attendant.

It will be readily apparent that animals may be quickly sprayed with insecticide or other solution and the vehicle may be readily transported from one place to another. During the spraying the solution passes over the bodies of the animals and through the grills 19' into the sump or receptacle 19.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A portable animal spraying device comprising a frame defining an enclosure, a floor for said enclosure, means dividing said enclosure into a spraying compartment and a drip compartment, a collection receptacle beneath said spraying compartment, means beneath said drip compartment for causing liquid to drain back into said receptacle, spray means in said spraying compartment, conduit means extending from said spraying means to said receptacle, means interposed in said conduit means for withdrawing liquid from said receptacle and elevating it so that it will be distributed through said spray means, movable side members pivotally mounted in said spraying compartment, means for adjusting the position of said side members, a ramp leading to said spraying compartment, a gate at the entrance to the spraying compartment providing access thereinto, a gate between said spraying and drip compartments, a gate at the exit of said drip compartment, means for lowering said last named gate to provide ramp means extending from the drip compartment and an auxiliary vessel connected to said collection receptacle for containing make-up for the materials sprayed.

2. In a portable animal spraying device structure forming an enclosure and including a floor, partitioning means within said enclosure providing spray and drip compartments, a collection receptacle supported from said structure in a position to collect excess liquid from said spray compartment, structure associated with the floor of said drip compartment for causing liquid to drain therefrom back into said receptacle, animal locating means disposed within said spray compartment and comprising at least one side member mounted for lateral inward movement with respect to the longitudinal axis of said device for properly locating the animal within said spray compartment, spray means operatively mounted in said spray compartment, conduit means including a flexible coupling extending from said spray means to said receptacle, means for circulating liquid from said receptacle to said spray means, means operatively associating at least a portion of said spray means with said animal locating means for movement therewith, means for adjusting the position of said animal locating means and said spray means, a ramp leading into said spray compartment, and a ramp extending from said drip compartment.

3. In a portable animal spraying device structure forming an enclosure and including a floor, partitioning means within said enclosure providing spray and drip compartments, said partitioning means being selectively operable to provide for passage of animals between said compartments, a collection receptacle supported from said structure in a position to collect excess liquid from said spray compartment, structure associated with the floor of said drip compartment for causing liquid to drain therefrom back into said receptacle, animal locating means disposed within said spray compartment and comprising at least one side member mounted for lateral inward movement with respect to the longitudinal axis of the device for properly locating the animal within said spray compartment, spray means operatively mounted in said spray compartment, conduit means including a flexible coupling extending from said spray means to said receptacle, means for circulating liquid from said receptacle to said spray means, means operatively associating at least a portion of said spray means with said animal locating means for movement therewith, means for adjusting the position of said animal locating means and said spray means, a ramp leading into said spray compartment and a ramp extending from said drip compartment.

GREEN B. SUTTLES, Jr.

REFERENCES CITED

The following references are of record in the file of this patent:

UNITED STATES PATENTS

| Number | Name | Date |
|---|---|---|
| 699,988 | Terrell et al. | May 13, 1902 |
| 774,279 | Seabury | Nov. 8, 1904 |
| 870,766 | Eaton | Nov. 12, 1907 |
| 883,132 | Goff | Mar. 24, 1908 |
| 1,511,450 | Findlay | Oct. 14, 1924 |
| 1,522,426 | Durham | Jan. 6, 1925 |
| 2,216,328 | Spangler | Oct. 1, 1940 |

FOREIGN PATENTS

| Number | Country | Date |
|---|---|---|
| 312,677 | Germany | June 2, 1919 |
| 27,268 | Australia | 1930 |